United States Patent [19]

Kamoshita

[11] Patent Number: 5,142,523
[45] Date of Patent: Aug. 25, 1992

[54] DISC PLAYBACK DEVICE

[75] Inventor: Yasuhiko Kamoshita, Hamamatsu, Japan

[73] Assignee: Yamaha Corporation, Hamamatsu, Japan

[21] Appl. No.: 225,004

[22] Filed: Jul. 27, 1988

[30] Foreign Application Priority Data

| Jul. 31, 1987 | [JP] | Japan | 62-192277 |
| Aug. 7, 1987 | [JP] | Japan | 62-197587 |
| Aug. 18, 1987 | [JP] | Japan | 62-204547 |
| Aug. 18, 1987 | [JP] | Japan | 62-204548 |

[51] Int. Cl.$^5$ .......................................... G11B 33/02
[52] U.S. Cl. ................................ 369/75.2; 369/77.2; 369/271; 360/99.06
[58] Field of Search ............... 369/75.1, 75.2, 77.1, 369/77.2, 271, 233, 258, 264, 270; 360/99.02, 99.03, 99.04, 99.05, 99.06, 99.07, 99.12

[56] References Cited

U.S. PATENT DOCUMENTS

| 4,498,161 | 2/1985 | Eisemann | 369/75.2 |
| 4,627,037 | 12/1986 | Tamaru et al. | 369/75.2 X |
| 4,739,428 | 4/1988 | Kamoshita et al. | 369/75.2 X |
| 4,802,158 | 1/1989 | Ogusu | 369/270 |
| 4,866,693 | 9/1989 | Odawara et al. | 369/75.2 |
| 4,926,410 | 5/1990 | Suzuki et al. | 369/290 |

Primary Examiner—William M. Shoop, Jr.
Assistant Examiner—David Martin
Attorney, Agent, or Firm—Spensley Horn Jubas & Lubitz

[57] ABSTRACT

The disc playback device is capable of playing back a disc such as a Compact Disc housed in its disc case without handling the disc with hands. The disc playback device comprises a loading mechanism having rollers which abut against both surfaces of a disc case and have rotational axes in the direction perpendicular to the direction of insertion of the disc case so as to take a disc housed in the disc case in or out of a loading section, the disc case being opened or closed pivoting about the base portion thereof, a clamping mechanism equipped with clamping members for clamping the disc case by inserting or releasing the clamping members into or from holes formed on both sides of the disc case, an opening/closing mechanism which opens and closes the disc case by holding the disc case on the base portion thereof with the rollers of the loading mechanism and inclining the rotational axes, a pressing/releasing mechanism having a pressing member which can fix or release the disc by pressing a catch provided at the center of the disc case, the pressing member being provided on a moving member movable between the loading section and a playback section, a holding mechanism provided on the moving member which houses the disc in the disc case and takes it out from the case, and the playback mechanism provided in the playback section which plays back the disc which has been transferred by the holding mechanism.

7 Claims, 6 Drawing Sheets

FIG. 1

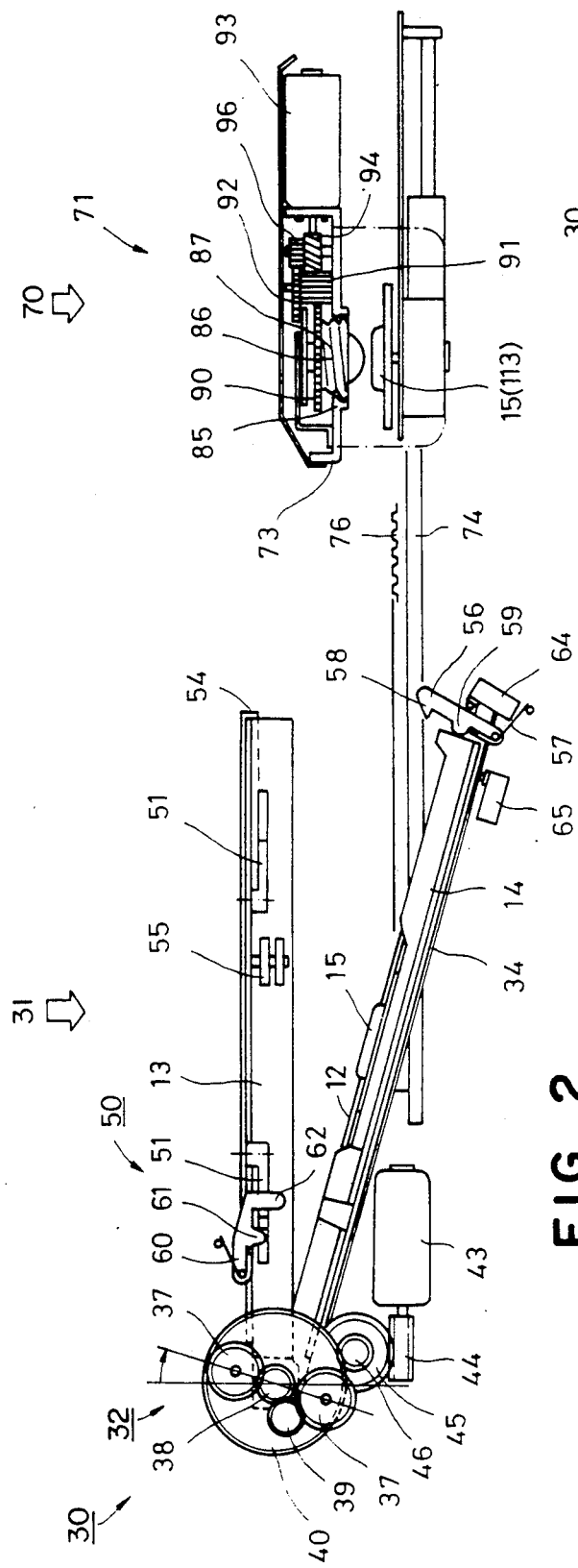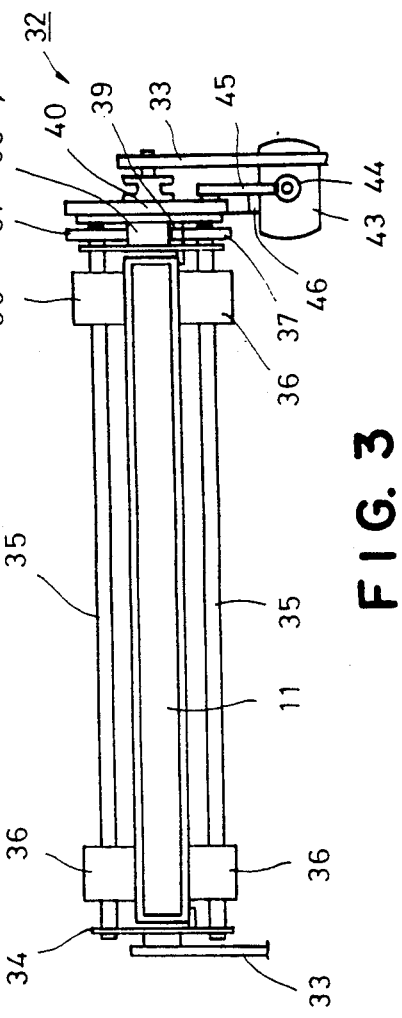
FIG. 2
FIG. 3

DISC PLAYBACK DEVICE

BACKGROUND OF THE INVENTION

This invention relates to a disc playback device capable of playing back Compact Discs housed in their disc cases so that users do not have to handle discs with hands.

In the prior art, when users wish to play back a disc such as a Compact Disc, they must take the disc out of its case and then load it in a disc playback device such as a Compact Disc player.

The methods for loading Compact Discs in a Compact Disc player can generally be classified into three as follows:

(1) The most generally used method is called a tray loading method in which users take a Compact Disc out of a case which stores a disc and load it on a tray provided on the side of a Compact Disc player.

(2) The second method, which is not currently used, is a modification of the tray loading method. In this method, a tray for playback is housed in a disc case, and a Compact Disc placed on the tray is loaded with the tray in a Compact Disc player.

(3) The third method is called a cartridge method which is often used for Compact Disc players carried on automobiles. A Compact Disc is transferred to a disc cartridge case for playback in advance, and is loaded in a Compact Disc player in a state packed in the cartridge case.

The conventional loading methods of Compact Discs described above are detrimental in the following respects:

(1) Since users take out Compact Discs with hands in the tray loading method (1), Compact Discs are highly susceptible to damages and stains. Users are required therefore to take utmost care in handling, and consequently loading and subsequent storing of Compact Discs after use take a long time.

(2) The modified tray loading method is improved in the simpleness of handling as users do not have to handle discs with their hands but only have to hold the tray for taking out a disc from the case. However, as large sized opening is formed on the tray for reading signals, and users may accidentally touch the Compact Disc with fingers, Compact Discs cannot be fully protected from damages.

(3) The cartridge method improves the defects of the above two methods in preventing damages and stains. Since, however, software producers of currently marketed Compact Discs do not adopt the cartridge method, users have to purchase disc cartridge cases separately and transfer discs into them. Commercially available disc cases usually contain title labels or liner notes with Compact Discs. When disc cartridge cases are used exclusively for playback purpose, these title labels and liner notes cannot be stored together in the cartridge case and this is rather inconvenient to the users.

Although efforts have long been made to find out a method which one can load a commercially available disc case housing a disc therein in a disc playback device (such as a Compact Disc player), there remain problems in achieving a mechanism which is simple in construction and yet effective in loading or unloading a disc case and moreover is easy in opening or closing the disc case. The key factor lies in the above mentioned mechanism. Further, it is necessary to develop an opening/closing mechanism which would not damage discs or disc cases in opening or closing of the disc cases.

Moreover, the method of clamping a commercially available disc case which is loaded in the disc playback device in a state housing a disc therein presents a significant problem.

Another problem lies in that the mechanism should allow a Compact Disc to be taken out or placed in the case easily but securely while pressing a circular catch which is provided at the center of a lower case for fixing the disc.

Under the above-mentioned current situation, demands have mounted high for the development of a device which can play back Compact Discs as they are housed in commercially available disc cases without directly handling them with hands.

SUMMARY OF THE INVENTION

It is, therefore, an object of the invention to provide a disc playback device having a clamping mechanism which can clamp a disc case with a disc stored therein in such a manner that the disc can be protected and easily handled.

It is another object of the invention to provide a disc playback device having a loading mechanism capable of loading and unloading a disc case storing a disc and opening and closing the disc case which has eliminated the above described disadvantages of the prior art playback devices.

It is another object of the invention to provide a disc playback device having a mechanism which can securely take out a disc from a case in which the disc is fixedly stored or store it in the case so as to prevent the disc from being stained or damaged.

It is still another object of the invention to provide a disc playback device capable of playing back a disc in a state housed in a disc case.

For achieving the first object of the invention, the disc playback device according to the invention comprises a clamping mechanism including clamping members provided within the disc playback device for being inserted in holes bored in corresponding arrangement to said clamping members on both sides of a disc case housing a disc.

For achieving the second object of the invention, the disc playback device according to the invention comprises a loading mechanism which includes rollers which abut against both surfaces of a disc case and have rotational axes arranged perpendicular to the insertion direction of the disc case, the disc case containing a disc and being opened and closed by pivoting about the base portion thereof, and an opening/closing mechanism which opens and closes said disc case by holding said disc case on the base thereof with said rollers and inclining the rotational axes of said rollers in respect of the insertion direction of said disc case.

For achieving the third object of the invention, the disc playback device according to the invention comprises disc housing and takeout mechanism including a pressing member which is reciprocally movable to press or release a circular catch formed at the center of a disc case against a moving member arranged to oppose the catch, and holding means for holding, housing and taking out the disc which is released from the catch on said moving member.

For achieving the fourth object of the invention, the disc playback device according to the invention comprises a loading mechanism including rollers which abut against both surfaces of a disc case and have rotational axes in the direction perpendicular to the direction of insertion of the disc case so as to take a disc housed in said disc case in or out of a loading section, the disc case being opened or closed by pivoting about the base portions thereof, a clamping mechanism including clamping members for clamping the disc case by inserting or releasing the clamping members into or from holes formed on both sides of a disc case provided at the loading section, an opening/closing mechanism which opens and closes the disc case by holding the disc case on the base thereof with rollers of said loading mechanism and inclining the rotational axes of said rollers from the insertion direction, a pressing/releasing mechanism having a pressing member which can fix or release the disc by pressing a catch provided at the center of the disc case, the pressing member being provided in such a manner as to reciprocally move on a moving member movable between the loading section and a playback section, a holding mechanism provided on said moving member which houses a disc in the disc case and takes out the disc from the disc case, and a playback mechanism provided in said playback section which plays back the disc which has been transferred by said holding mechanism.

The clamping mechanism of the disc playback device according to the invention takes a step ahead for the realization of automatic operation of disc playback devices for opening or closing and loading or unloading of disc cases as it clamps the disc cases by utilizing existing square holes in the disc cases, inserting the clamping members therein or releasing the clamping members therefrom. The device exploits the fact that currently available disc cases for Compact Discs are of the type which are opened and closed in the vertical direction by pivoting about the base portion thereof and which are formed with four square holes, and more particularly one hole each is provided on the side of the case on both sides of an upper case corresponding to projections provided for retaining liner notes etc.

The loading mechanism of the disc playback device according to the invention can load or unload a disc case such as a commerically available Compact Disc case which opens up or closes down in the vertical direction by using rollers which abut against the upper and lower surfaces of the disc case and hold it on both surfaces, and opens or closes the case by inclining the direction of the line connecting rotational axes of the upper and lower rollers from the direction perpendicular to the direction of loading or unloading of the disc case so that the base of the disc case is held on the side of opening or closing with the inclining movement of the rollers in order that the loading or unloading operation and the opening or closing operation can be performed as an integral serial operation by a single drive source.

According to the disc playback device of the invention comprising the disc housing and takeout mechanism, the pressing member is provided on the moving member so that it is opposed to the catch of the disc case where the case fixedly stores a disc such as a commerical Compact Disc on the circular catch at the center of the disc case. The mechanism moves the pressing member reciprocally to fix or release the disc by pressing the circular catch for taking out the disc with the holding means or storing the same to thereby eliminate the necessity of handling the disc with hands.

In another aspect of the invention, the disc playback device enables automatic playback of the disc without handling the disc with hands simply by providing the holding section and playback section in the disc playback device, loading or unloading a disc with rollers of the loading mechanism as it is stored in a disc case, clamping the disc case on the side of the clamping members with inserting or releasing the clamping members of the clamping mechanism into the holes on both sides of the case, opening or closing the disc case with the opening/closing mechanism which inclines the rotational axes of the rollers, the case being held on both sides with the rollers of the loading mechanism, fixing or releasing the disc by pressing a disc fixing catch of the opened case with the press member on the moving member, and transferring the disc to the playback mechanism by taking it out with the holding mechanism or taking the same out of the playback mechanism and placing and fixing it in the disc case.

A preferred embodiment of the invention will now be described with reference to the accompanying drawings.

BRIEF DESCRIPTION OF THE DRAWINGS

In the accompanying drawngs relating to an embodiment in which the invention is applied to a Compact Disc player, FIG. 1 is a plan view of the disc playback device;

FIG. 2 is a partially sectional front view of the device;

FIG. 3 is a left side view of the device;

DESCRIPTION OF A PREFERRED EMBODIMENT

The drawings illustrate an embodiment of the disc playback device of the invention applied to a Compact Disc player.

The operation of a Compact Disc player 10 for loading a Compact Disc 12 as housed in a disc case 11, opening and closing of the case, taking out and transferring the disc for playing back is fully automated. After the disc is played back, the disc is ejected from the device as housed in the disc case 11.

Figure 9:
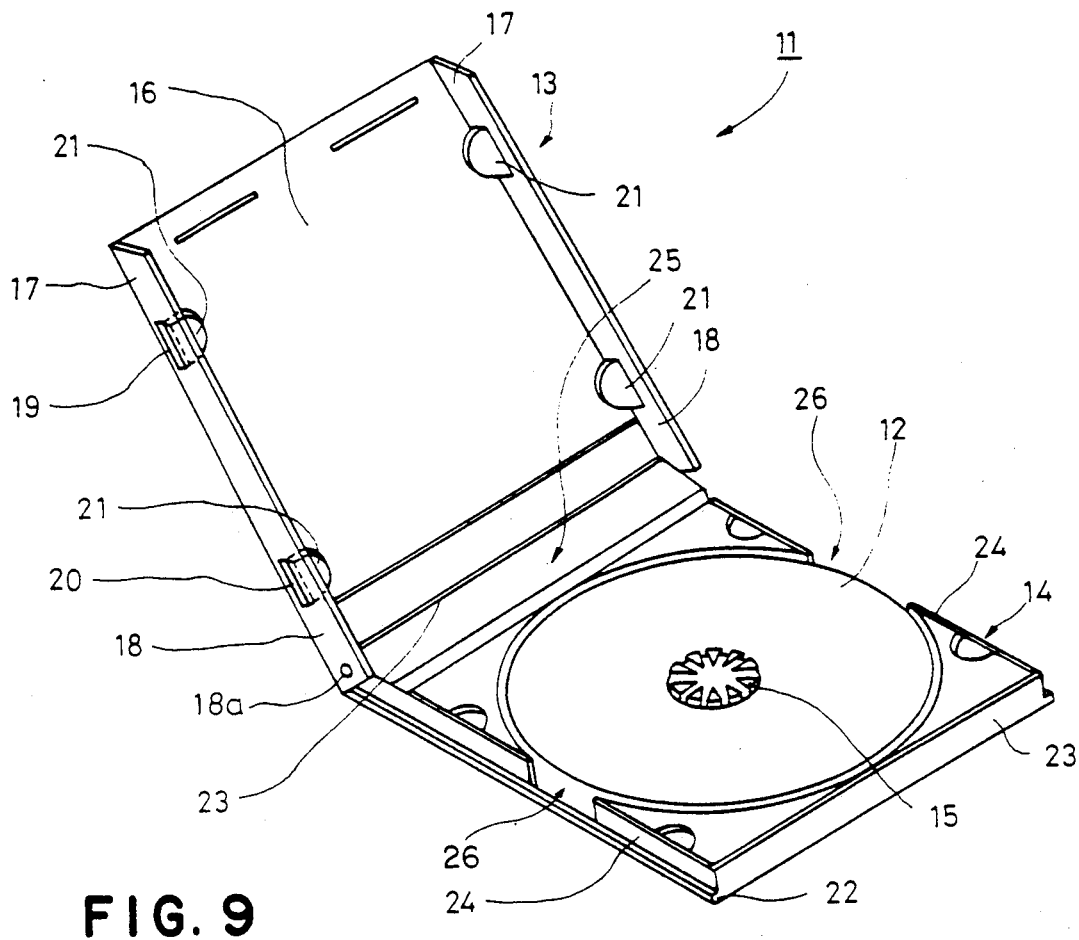
FIGS. 9 and 10 are perspective and side views respectively of a Compact Disc case.
Figure 10:
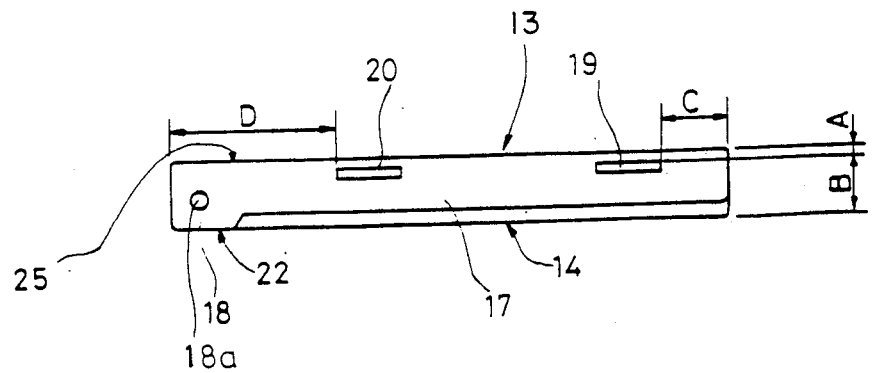

As shown in FIGS. 9 and 10, the disc case 11 which is currently available in the market to store a Compact Disc 12 to be played back by the Compact Disc player 10 comprises an upper case 13 and a lower case 14. The disc case 11 can be opened or closed by pivoting the upper case 13 against the lower case 14 about the base portion of each case and can fix the Compact Disc 12 on a central opening with a circular catch 15 formed on the lower case 14. The Compact Disc 12 can be released from the disc case 11 by pressing the catch 15.

The upper case 13 of the disc case 11 has a square top plate 16 having a side slightly larger than the diameter of the Compact Disc 12 and side walls 17 extend outward from their base portions to define connecting parts 18 for opening and closing, and a pair of supporting pins 18a opposing each other are formed integrally in the connecting parts 18. The side walls 17 are respectively bored with two square through holes 19, 20. The square holes 19, 20 are arranged vertically at positions apart from the surface of the upper case 13 by the distance A and apart from the surface of the lower case 14 (or the reverse surface of the disc case 11) by the distance B. In other words, they are positioned above the center of the height. The square holes 19 is positioned laterally apart from the front end of the disc case 11 by the distance C on front side while the square hole 20 is apart from the rear end of the disc case 11 by the distance D on the base side. Laterally the square hole 20 is closer to the center as the relations D>C holds. the upper case 13 is formed with semicircular projections 21 at positions corresponding to the square holes 19, 20 to retain liner notes (not shown).

The lower case 14 whose base portion 25 is connected to the upper case 13 is the base portions thereof has an elongated rectangular bottom plate 22, front and rear walls 23 and side walls 24 which are all formed integrally. The side walls 24 which are disposed inside the side walls 17 of the upper case 13 by the thickness of the side walls 17. The upper case 13 may be placed and connected in a freely openable manner with the lower case 14 by engaging the supporting pins 18a of the connecting parts 18 of the upper case 13 in holes formed in the base portion of the side wall 24.

The longitudinal length of the lower case 14 is therefore substantially equal to the combined lengths of the side walls 17 of the upper case 13 and of the connecting parts 18 projecting from the base portion thereof. The base portion 25 of the lower case 14 is positioned between the connecting parts 18 of the upper case 13, and the upper surface thereof defines an exposed portion at the level substantially equal to the surface of the upper case 13 and is usually serrated.

Notches 26 are cut at the center of the side walls 24 of the lower cases 14 so as to allow a Compact Disc 12 to be held at both sides thereof with fingers when it is being taken out. Notches are useful in taking out or transfer of the disc after the case is loaded.

Projections for engagement (not shown) are formed on side walls 17 of the upper case 13, and recesses for engagement are formed at positions corresponding to the projections on side walls 24 of the lower case 14 for retaining the upper and lower cases 13 and 14 in a closed state when closed. Because of the above arrangement, the force usually sufficient to lift the upper case 13 would not open it when it houses an ordinary Compact Disc.

Description will now be given to the loading mechanism 30 which loads and unloads the Compact Disc 12 housed in the disc case 11 into the Compact Disc player 10.

The loading mechanism 30 is mounted at a loading section 31 of the Compact Disc player 10 for loading and unloading the disc case 11. The mechanism functions as the opening/closing mechanism 32 of the disc case 11 as is loaded in the player 10.

Figure 4:
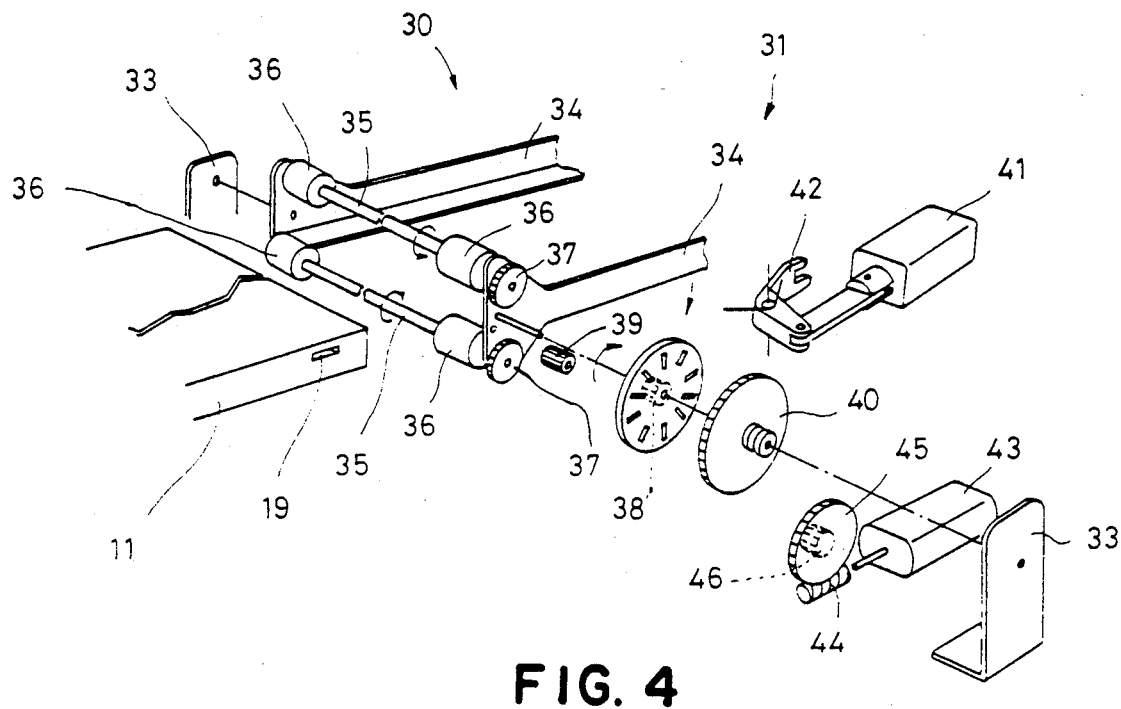
FIG. 4 is a partially exploded pespective view of the loading mechanism and of the opening/closing mechanism.

As illustrated in FIG. 4, the loading mechanism 30 which functions also as the opening/closing mechanism 32 comprises a pair of brackets 33 on both sides of the disc case 11 on a chassis at the front opening of the Compact Disc player 10, and a pair of T-shaped lower case holders 34 having tip ends shaped substantially like a letter L which are supported by the pair of brackets 33 in such a manner that they can rotate in a vertical plane. A bottom plate 22 of the lower case 14 is supported by the L-shaped tip ends.

Two rollers axes 35 are supported in a freely rotatable fashion and in parallel to each other between the bases of the pair of lower case holders 34. Rollers 36 are attached at the ends of the roller axes 35, the rollers 36 contacting both the upper and lower surfaces of the disc case 11. When the disc case 11 is inserted while maintaining the lower case holders 34 horizontally and allowing the title label at ends of the case 11 to project slightly from the player 10 in a predetermined loading state, the upper and lower rollers 36 are adapted to press and hold the bottom plate 22 and the exposed portion 25 of the lower case 14.

As the two roller axes 35 are positioned in the vertical direction which is perpendicular to the horizontal inserting direction of the disc case 11 along the L-shaped portions of the lower case holders 34, when the lower case holders 34 are rotated, the two roller axes 35 are inclined from the vertical direction. Outside the lower case holder 34 at an end of the roller axes 35 are provided respectively roller gears 37. A center gear 38 is loosely fit in a supporting axis of the lower case holders 34, i.e., the center of rotation thereof for engaging with the upper roller gear 37 while an idle gear 39 is rotatably mounted on the lower case holder 34 to be engaged with the center gear 38 as well as with the lower gear 37.

A clutch gear 40 loosely fits coaxially with the center gear 38 so as to drive or rotate the upper and lower roller gears 37. Transmission of driving force between the center gear 38 and the clutch gear 40 is controlled by operating a clutch arm 42 which is manipulated by a clutch plunger 41. The clutch gear 40 is engaged with a pinion 46 integrally formed with a worm wheel 45 which is in mesh with the worm 44 of the loading motor 43.

When the clutch gear 40 is released, a manual loading state can therefore be created where the upper and lower roller axes 35 and the rollers 36 may be freely rotated irrespective of the worm 44 and the worm wheel 45 associated with the loading motor 43. When the clutch gear 40 is engaged, on the other hand, the rotation of the loading motor 43 is transmitted from the worm 44 to the worm wheel 45, the pinion 46, and the clutch gear 40 to the center gear 38 so that the roller gears 37 integrally formed with the upper roller axis 35 can be directly driven, and at the same time, the roller gear 37 integrally formed with the roller axis 35 is driven in the opposite direction via the idle gear 39 to create an automatic loading state.

When the mechanism is used as the opening/closing mechanism 32, roller gears 37 mounted on the upper and lower roller axes 35 are locked to inhibit rotation thereof, and the loading motor 43 is further driven so that the lower case holders 34 are rotated about the supporting axis of the center gear 38 with the center gear 38 and the upper roller gear 37 being locked. This makes the roller axes 35 of the upper and lower rollers 36 inclined from the vertical direction to twist the lower case 14 alone which is held between the upper and lower rollers 36 to open or close the case.

Description will now be given to the clamping mechanism 50 which clamps the case 11 for opening and closing and which fixes the case 11 at a predetermined position at the loading section 31 after the case is loaded by the loading mechanism 30.

As shown in FIGS. 1 through 5, the clamping mechanism 50 functions when the disc 12 in the disc case 11 is inserted into the Compact Disc player 10 with a title label attached at the rear end of the case 11 slightly projecting outward from the player 10. Clamping members 51 are provided on a chassis (not shown) in such a manner as to freely rotate about a vertical axis at positions corresponding to the front square hole 19 and the rear square hole 20 of the disc case 11 under the above mentioned state.

The clamping members 51 are respectively provided with cams 52 projecting inward to be engaged with the square holes 19 and 20. The cams 52 define smooth arc shape respectively at the front and rear portions in the directions the disc case 11 is inserted so that the disc case 11 may smoothly slide over the cams 52.

These clamping members 51 are energized toward the side of the disc case 11 with clamper springs 53.

As shown in FIG. 2, stoppers 54 shaped like a letter L are fixed on the chassis to restrict the position of the tip of the case 11 at a predetermined position and abut against the front ends of the upper case 13. Guide rollers 55 are provided on the chassis in the number of two for each side, totalling four when combined, which abut on the side walls 17 of the upper case 13 in order to prevent lateral displacement of the case 11.

At the tip ends of the lower case holders 34 are attached levers 56 which are horizontally rotatable and which are energized toward the side of insertion of the case 11 with springs 57. Upper end engaging means 58 is held by the stoppers 54 to support the lower case holder 34 horizontally at the normal time while the levers 56 are disengaged from the stoppers 54 when intermediate projections 59 are pushed by the disc case 11 to permit rotation of the lower case holders 34.

To secure the clamping with the members 51, lock levers 60 are further provided respectively behind the clamping members 51 which are inserted in or released from the rear surface holes of the case 11 in such a manner as to freely rotate in horizontal direction.

These lock levers 60 are arranged with the rotation axis positioned above the upper surface of the clamping members 51 and are provided with lock members 61 projecting downward from the intermediate sections respectively. Moreover, they are provided with follower sections 62 on the tip ends thereof which abut on the projections of the lower case holders 34 following the opening and closing movement of the lower case holders 34 so that when the lower case holders 34 are rotated downward for opening, the lock sections 61 come down behind the clamping members 51 to abut thereon to create a locked state while when the lower case holders 34 are maintained horizontal, the follower sections 62 are in a pushed up state to allow free rotation of the clamping members 51.

In order to automate the loading mechanism 30, opening/closing mechanism 32 and clamping mechanism 50, and in order to discriminate whether or not the disc case 11 is loaded in the correct position (vertically as well as horizontally), a posture detection switch 63 is provided behind one of the clamping members 51 for the square holes 19 at the tip end side of the disc case 11, and this switch 63 is turned off when the cams 52 of the clamping members 51 are inserted into the square holes 19, and are turned on when the cams 52 abut on the side walls of the case 11 and thereby are pushed back.

Figure 5:
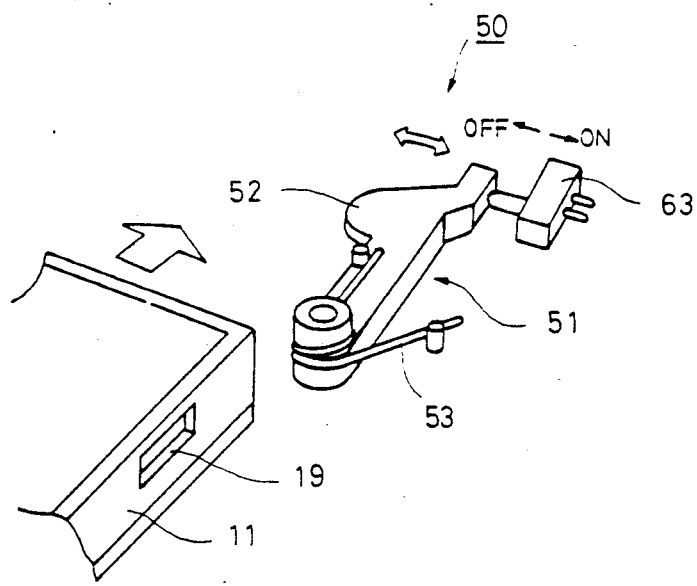
FIG. 5 is a partial perspective view of the clamping mechanism.

As shown in FIG. 5, when the disc case 11 is being inserted, the cams 52 ride over the tip ends of the side walls 17 of the case 11 to turn the posture detection switch 63 from OFF to ON, and when the disc case is further pushed inward to cause the cams 52 to engage in the square holes 19 in the clamping state, the switch is turned from ON to OFF so as to indicate that the case has been loaded in the correct direction.

Conversely, if the case 11 is loaded in an incorrect directions, the switch 63 cannot be turned from ON to OFF once it is turned ON in a predetermined interval as the positions of the square holes 19 and 20 are determined to hold the relation $A<B$ in the vertical direction and $D>C$ in the horizontal direction. Therefore, loading to a case in an incorrect direction can be easily discriminated.

It is arranged through electrical connection that when the switch 63 is first turned from OFF to ON, the loading motor 43 and the clutch plungers 41 are actuated to start automatic loading.

Moreover, behind the levers 56 in the disc case insertion direction is mounted a tip end detection switch 64 which is adapted to be turned from OFF to ON when the disc case 11 is inserted into a predetermined depth to abut on the stoppers 54, and the levers 56 are pushed on the intermediate projections 59 thereof to release the means 58 from the stoppers 54.

The tip end detection switch 64 is to be used in combination with the posture detection switch 63 for reloading of the disc case 11 if it is loaded in an incorrect direction. In other words, when the loading motor 43 and clutch plunger 41 are actuated to start automatic loading, and the switch 64 is turned from OFF to ON, and if the switch 63 is not turned from ON to OFF simultaneously with the turn-on of the other switch, then the square holes 19 are judged not to be at predetermined positions, and electric connection is rearranged so that the motor 43 is suspended and reversely rotated until the disc case 11 returns to the inlet opening.

When the tip end detection switch 64 is turned on, it is judged that the levers 56 are released from the stoppers 54 to place the lower case holder 34 in a rotatable state.

As shown in FIG. 2, in order to detect that the disc case 11 is opened with the mechanism 32, a detection switch 65 is provided at a position corresponding to the low position of the opened case holder 34, and is adapted electrically to be turned from OFF to ON when it is pushed with the lower surface of the lower case holder 34 and to suspend the rotation of the motor 43.

Description will now be given to a pressing/releasing mechanism 71 and a holding mechanism 72 for taking the Compact Disc 12 out of the case 11 which is clamped by the loading section 31 for opening, and transferring it to a playback section 70 or further transferring it to the disc case 11.

These mechanism 71 and 72 are mounted on a sliding table 73 functioning as a moving member which moves between the loading section 31 and the playback section 70.

The sliding table 73 is guided by rollers 75 having U-shaped grooves which hold rails 74 on both upper and lower surfaces, the rails extending between the loading section 31 and playback section 70 on both sides of the disc case 11.

Figure 6:
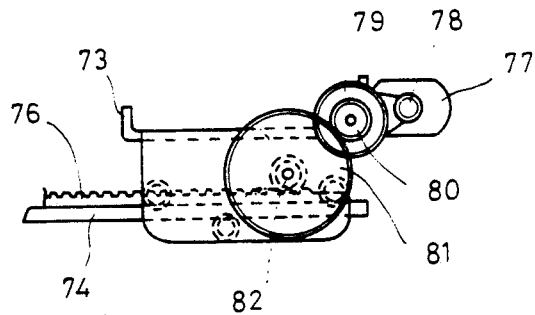
FIG. 6 is a frontal view of the driving mechanism of a sliding table.
Figure 7A:
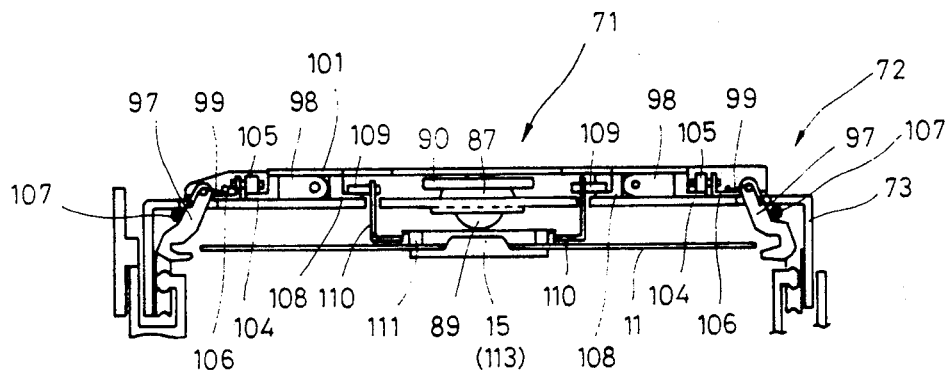
FIG. 7 is a sectional view of the pressing/releasing mechanism and of the holding mechanism.
Figure 7D:
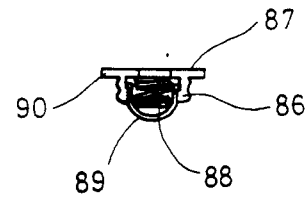
Figure 7B:
Figure 7C:
Figure 8A:
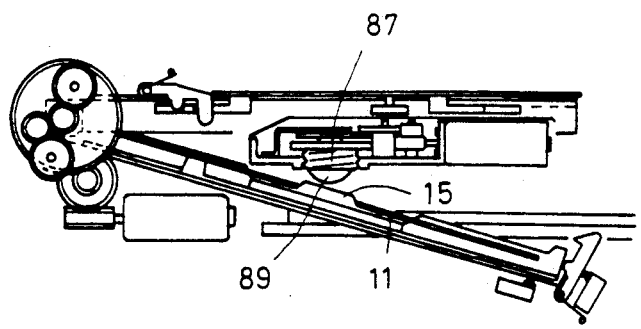
FIG. 8 is an explanatory view of the operation of the pressing/releasing mechanism and of the holding mechanism.
Figure 8B:
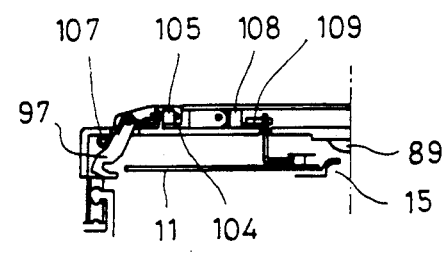
Figure 8C:
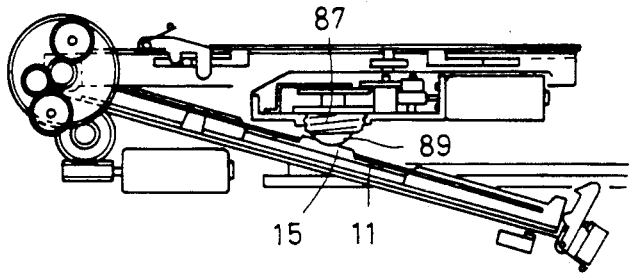
Figure 8D:
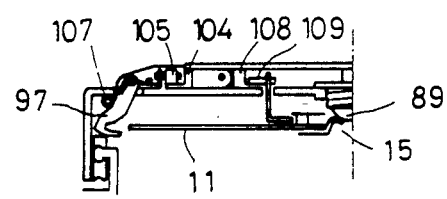
Figure 8E:
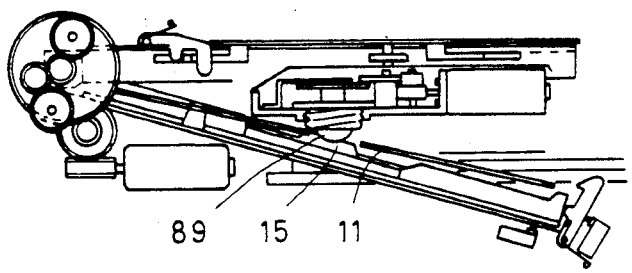
Figure 8F:
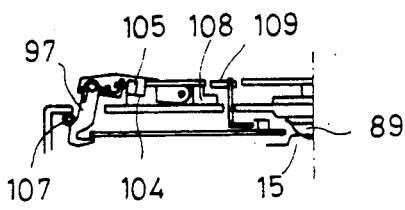
Figure 8G:
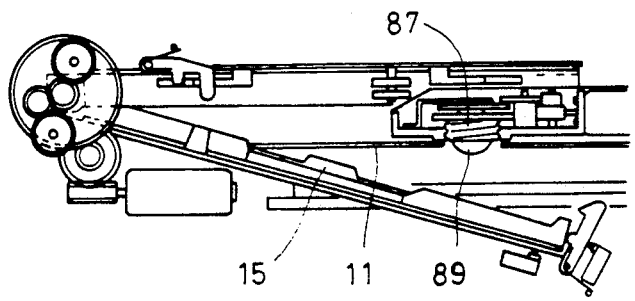
Figure 8H:
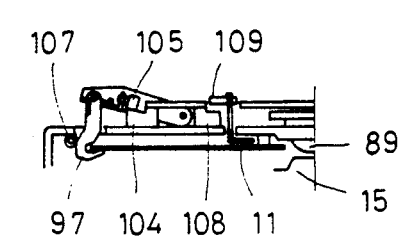

Two rack rails 76 are arranged along and outside the rails 74 for driving the sliding table 73. As shown in FIG. 6, the table 73 is moved by engaging the rack rails 76 with drive pinions 82 which are driven by a motor 77 mounted on the table 73 via two pulleys 78, 79 and two gears 80, 81. End switches 83, 84 are mounted at the front and rear end portions of the sliding area of the sliding table 73.

The sliding table 73 has a width broader than the diameter of the Compact Disc 12, and is provided at the center thereof with the pressing/releasing mechanism 71 which releases or fixes the Compact Disc 12 by pressing a circular catch 15 at the center of the disc case 11.

As shown in FIGS. 2 and 7, the mechanism 71 is adapted to move the supporting member 87 reciprocally in vertical direction by mating a male screw 86 of the member 87 with a female screw 85 formed at the center of the sliding table 73.

The member 87 is provided at its end with a semispherical press 89 via a limit spring 88 and is energized downward. The limit spring 88 is compressed when a force beyond a predetermined magnitude is applied so as to prevent an excessive force being applied on the press 89.

The member 87 is provided integrally on the base thereof with a large-sized spur gear 90 in order to reciprocally drive the press 89, and the spur gear 90 is engaged with a spline gear 91 journalled on the sliding table 73 so as to enable the transmission of driving force in both ways.

The spline gear 91 is integrally provided with a gear 92. When a motor 93 mounted on the sliding table 73 drives a worm 94 and a worm wheel 95, the gear 96 which is integral to the worm gear 95 and is in mesh with the gear 92 is driven to rotate. Thus, the spline gear 91 is driven by the motor 93.

Therefore, when driving force is transmitted by the motor 93 to the spline gear 91, and the large-sized spur gear 90 which is integral to the member 87 is rotated, the member 87 is rotated and is moved vertically with the male screw 86 of the member 87 mating with the female screw 85 of the sliding table 73 to thereby reciprocate the press 89.

Description will now be given to the holding mechanism 72 which releases engagement of the Compact Disc 12 from the catch 15 or conversely fix the Compact Disc 12 with the catch 15 while the catch 15 is being pressed by the press 89 of the mechanism 71.

Figure 1:
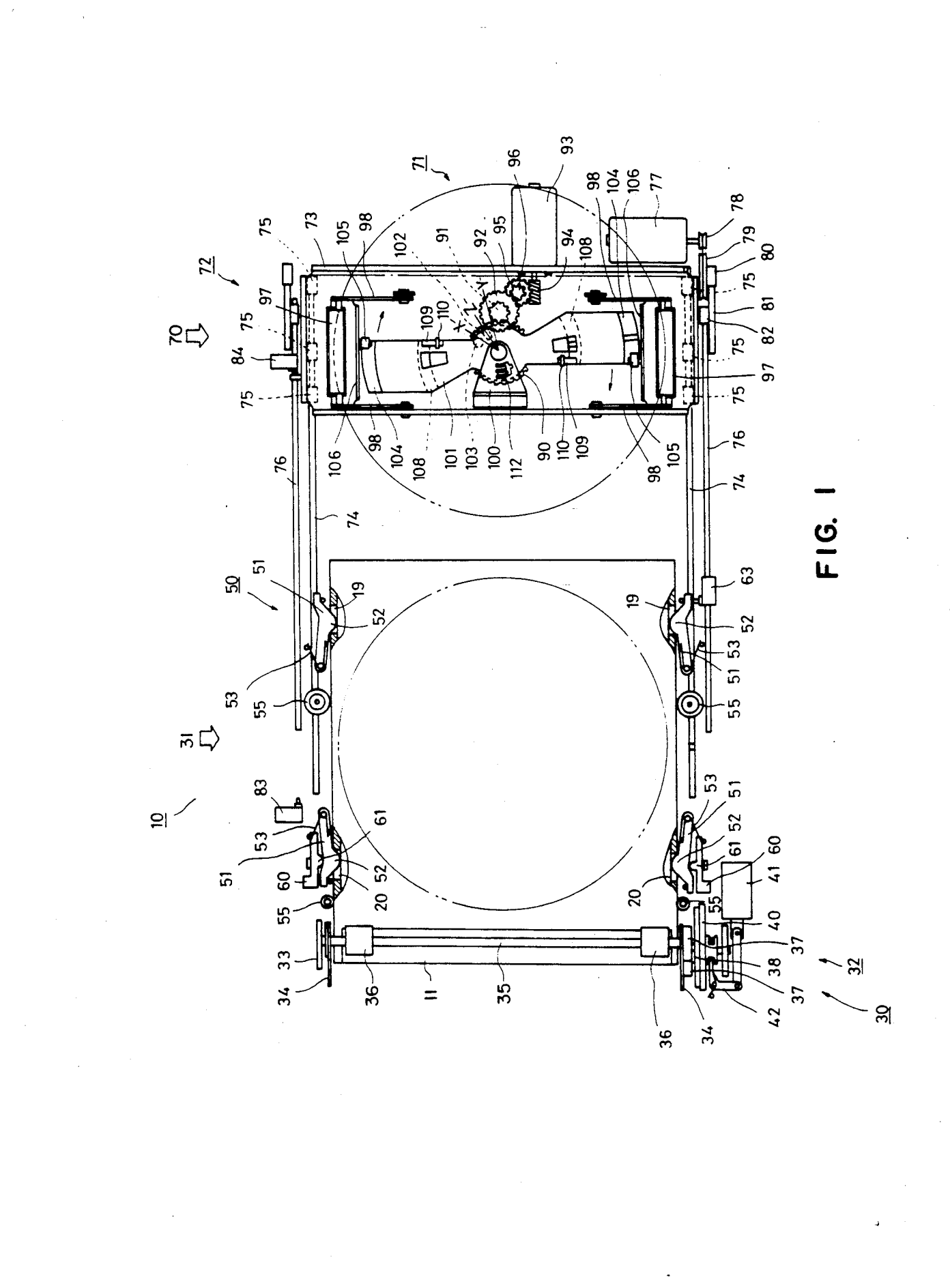

As shown in FIGS. 1 and 7, the mechanism 72 is provided with hooks 97 on both sides of the sliding table 73 which are to be arranged on both sides of the disc case 11. The hooks 97 are suspended downward by pins at the ends of links 98 respectively and the links 98 are rotatably mounted at the bases thereof to the sliding table 73 by means of screws.

Both these hooks 97 are formed with holding portions on their inside portions which respectively have a width sufficient to hold the Compact Disc 12, and therefore even if the Compact Disc 12 is inserted obliquely, the hooks 87 can hold it on both sides to restore it to a horizontal state.

The length of the link 98 is determined in such a manner that an end thereof is positioned substantially on the outer periphery of the Compact Disc 12, and a spring 99 is interposed between each of the link 98 and the hook 97 in order to energize the hook 97 outward.

In order that the pair of hooks 97 are interlocked with the mechanism 71 to hold the Compact Disc 12 only while the catch 15 of the disc case 11 is being pressed with the press 89, there is provided a cam arm 101 which extends toward both sides of the disc case 11 in the longitudinal direction of the sliding table 73, has the center thereof coaxially with the press 89, and is horizontally rotatably supported by a bracket 100.

The cam arm 101 is formed with a projection 102 in the radial direction on the lower surface of the center thereof so as to be rotated when the projection 102 is in abutting engagement with a center knob 103 formed integrally with the large spur gear 90 which is integral to the member 87 and is opposing the cam arm 101. The center knob 103 has a height sufficient to abut against the projection 102 regardless of whether the spur gear 90 is elevated or lowered by the reciprocal vertical movement of the number 87.

As shown in FIG. 7 in cross section, the cam arm 101 is provided with cams 104 on both sides thereof in order to elevate or lower the hooks 97, and the cams 104 are respectively formed with a concave having a recess at the center therof. Lifters 106 having rollers 105 are mounted on the cams 104, and are attached to links 98 connected to the hooks 97 at both ends thereof so as to elevate or lower the hooks 97 when the rollers 105 move on the cams 104 by rotation of the cam arm 101.

Hook rollers 107 are mounted on the sliding table 73 to abut against the backs of the hooks 97 in order to open or close the hooks 97 on both sides in interlocked relationship with the vertical movement of the hooks 97. When the hooks 97 are raised, the hooks 97 at both sides are forced to approach each other and to be closed by the hook rollers 107.

Cams 108 for a stabilizer 111 in the form substantially similar to that of the cams 104 for the hooks 97 are provided on the cam arm 101 on both sides at intermediate portion thereof. On the cams 108 are suspended lifters 110 for the stabilizer 111 via rollers 109, which hold the cylindrical stabilizer 111 comprising a magnet at the lower end thereof. The stabilizer 111 is moved vertically when the rollers 109 move on the cams 108 by the rotation of the cam arm 101, and is adapted to clamp the Compact Disc 12 with magnetic force with a disc table 113 made of iron, for example, of the playback section 70 when lowered.

As the relation between the hooks 97 and the lifters 110 changes due to the rotational position of the cam arm 101 which moves the hooks 97 and the lifters 110 for the stabilizer 111, there is provided a switch 112 for detecting the rotational angle of the arm 101 on the bracket 100 and thereby detecting the rotational position of the arm 101. More particularly, it is adapted to detect three positions, namely the lower ends X and Y and the upper end Z where the rollers 105 and 109 come to position on both ends and the center position of the cams 104 for hooks 97 and the cams 108 for stabilizer 111. The rotational angle and direction of the motor 93 are controlled using the detection results by the switch 112.

There is provided in the playback section 70 a playback mechanism having unillustrated optical pickup, signal processing section and servo control section besides the disc table 113 which are necessary for playback of the Compact Disc 12.

Description will now be made about automatic playback of the Compact Disc 12 by the Compact Disc player 10 having the construction described above as well as the operations of the respective mechanisms.

[1] Loading operation (1) The disc case 11 is inserted between the upper and lower rollers 36 of the loading section 31 from an opening of the Compact Disc player 10. As the clutch plunger 41 is not actuated and the clutch gear 40 is open, the rollers 36 are idle so as to facilitate manual insertion of the disc case 11.

(2) When the disc case 11 is further inserted, the cams 52 of the clamping member 51 at the end thereof are pushed back by the side walls 17 of the disc case 11, and the posture detection switch 63 is turned on, the clutch plunger 41 is pulled to engage the clutch gear 40. At the same time, the loading motor 43 is actuated to drive the rollers 36 to thereby conduct automatic loading of the case 11.

(3) When the disc case 11 is automatically loaded, and the intermediate projections 59 of the levers 56 are pushed by an end of the disc case 11, the switch 64 for detecting the end is turned on and at the same time the cams 52 of the clamping member 51 are engaged in the square holes 19 and 20 of the disc case 11 to thereby clamp the case 11. By this time the posture and direction of the loading of the case 11 have been discriminated, and when the switch 63 has been turned from ON to OFF, the loading motor 43 continues rotation while when the switch 63 is still ON, the motor 43 is suspended, and reversed to eject the case 11 for reloading.

(4) When the motor 43 is slightly turned from the state where the disc case 11 is clamped, the tip square section of the case 11 comes to abut against the stoppers 54 to enter the predetermined loading condition. The upper and lower rollers 36 and the roller gears 37 become locked and unable to rotate, and at the same time the upper ends 58 of the levers 56 are released from the stoppers 54 to allow rotation of the lower case holder 34. In this state, the disc case 11 is clamped on the upper case 13 with the clamping members 51, and the bottom plate 22 and the exposed section 25 of the lower case 14 are held between the rollers 36, and the line connection centers of the roller axes 35 extends perpendicularly to the direction of insertion.

(5) When the motor 43 is further rotated with the upper and lower rollers 36 in a locked state, an end of the lower case 14 which has been sandwiched with the lower case holder 34 and the rollers 36 is rotated downward about the axis of the center gear 38 (which is also the fulcrum of the lower case holder 34) while the center gear 38 and the upper roller gear 37 are still locked to thereby incline the center line of the roller axes 35 from the vertical direction of insertion to twist the base of the lower case 14. Interlockingly with the rotational movement of the lower case holder 34, the lock levers 60 are rotated downward and the lock members 61 come to position behind the clamping members 51 to thereby prevent the clamping members 51 from detachment.

(6) When the motor 43 is further rotated and the lower case holder 34 is rotated to reach the lower end (for example, ca. 15 degrees from the horizontal line), the switch 65 is turned on to suspend the motor 43.

(7) In order to take out the Compact Disc 12 from the lower case 14 of the disc case 11 which has been clamped with the loading section 31 and in an inclined state, and to transfer the same to the playback section 70, as shown in FIG. 8, the motor 77 is actuated immediately after the suspension of the motor 43, then the sliding table 73 which has been in stand-by mode at the playback section 70 is moved to the loading section 31, and is suspended at a predetermined position where the switch 83 is turned on. In this state, the cam arm 101 of the holding mechanism 72 mounted on the sliding table 73 is in the following state; the rollers 105 for the hooks 97 and the rollers 109 for the stabilizer 111 are positioned at the lower end X of the cams 104 for the hooks 97 and the cams 108 for the stabilizer 111, the hooks 97 and the lifters 110 have been lowered, the hooks 97 are open at both sides, and the center knob 103 of the large-sized spur gear 90 is in abutting engagement with the projection 102 of the cam arm 101 at the leading edge side in the counterclockwise direction of the center knob 103 (relation opposite to the one shown in FIG. 1).

(8) When the motor 93 is turned clockwise (hereinafter referred to as the normal direction), the rotational driving force is transmitted in the order of the worm 94, the worm wheel 95 and the gear 96, the gear 92 and the spline gear 91 and the large spur gear 90. The male screw 86 of the member 87 causes the press 89 to lower via the limit spring 88 to press the catch 15 of the disc case 11. As a result, while the catch 15 is being pressed by the press 89, the engagement of the Compact Disc 12 by the catch 15 is released. While the press 89 is being lowered, the spur gear 90 is rotated in the normal direction, but the center knob 103 is rotated clockwise without pushing the projection 102 until it abuts against the opposite side of the projection 102 (the relation shown in FIG. 1). The pitches of the male screw 89 of the member 87 and the female screw 85 of the sliding table 73 are determined therefore to obtain a desired vertical distance when the center knob 103 integrally formed with the member 87 rotates from one side of the projection 102 to the other.

(9) When the motor 93 is further driven while the catch 15 is still being pressed by the press 89, and the center knob 103 of the large spur gear 90 pushes the projection 102 of the cam arm 101, to rotate the cam arm 101 from the lower end X to the center Z, then the hooks 97 are raised from both sides of the Compact Disc 12 which has been released from the catch 15 of the case 11 by the cams 104, and at the same time the hooks 97 are closed on both sides by the rollers 107 to thereby hold the Compact Disc 12 which has been placed in an inclined state to restore its attitude gradually to the horizontal state due to the width of the hooks 97 per se as the hooks 97 are being closed.

(10) After holding the Compact Disc 12 with the hooks 97 and taking it out from the case 11, the motor 93 is reversely rotated to raise the press 89 leaving the cam arm 101 at such position.

(11) In order to transfer the Compact Disc 12 held by the hooks 97 to the playback section 70, the motor 77 is actuated and the sliding table 73 is moved to the playback section 70 and suspended at a position where the switch 84 is turned on. In this state, the disc table 113 of the playback section 70 and the press 89 of the sliding table 73 are positioned to oppose each other.

(12) The motor 93 is driven normally, and the press 89 is lowered while the Compact Disc 12 is still being held by the hooks 97 to center the same on the disc table 113.

(13) The motor 93 is further driven normally, and the cam arm 101 is rotated with the center knob 103 abutting against the projection 102 to thereby position the rollers 105 and 109 at the lower end Y which is opposite to the lower end X with respect to the center Z respectively. This lowers the hooks 97 holding the Compact Disc 12 and at the same time, opens the springs 99 outward, and places the disc on the disc table 113. Simultaneously, the lifters 110 of the stabilizer 111 are lowered by the cams 108 for the stabilizer 111 and the Compact Disc 12 is fixed on the disc table 113 by the stabilizer 111 which is held at the lower end of the lifters 110 in advance.

(14) Then, the motor 93 is reversely driven to raise the press 89.

(15) After completing the mounting of the Compact Disc 12 in the disc table 113 of the playback section 70, the operation proceeds to playback of the Compact Disc.

The ejecting operation to take out the Compact Disc 12 out of the disc player 10 after it is played back will be described below. Since this operation is substantially reverse to the loading operation explained above, explanation will be made brief.

[Ejecting operation]

(1) A playback operation is suspended by operation of an ejecting switch to start an ejecting operation as shown in FIG. 8.

(2) The motor 93 is reversely rotated to turn the cam arm 101 which has been positioned at the lower end Y to the lower end X at the opposite side.

(3) The motor 93 is then normally rotated to lower the press 89 and the press 89 is centered on the disc table 113.

(4) The motor 93 is normally rotated to turn the cam arm 101 from the lower end X to the center Z, and to raise the hooks 97 as well as the lifters 110. Then, the Compact Disc 12 is held with the hooks 97 and at the same time the stabilizer 111 is raised to be released from the disc table 113.

(5) Then, the motor 93 is reversely rotated to raise the press 89.

(6) The motor 77 is rotated to move the sliding table 73 to the loading section 31 to thereby transfer the Compact Disc 12.

(7) The motor 93 is normally roatated to lower the press 89 which presses the circular catch 15 of the lower case 14.

(8) The motor 93 is further normally rotated to turn the cam arm 101 from the center Z to the opposite lower end Y. The hooks 97 are lowered to place the Compact Disc 12 upon the catch 15 to release the same.

(9) The motor 93 is then reversely rotated to raise the press 89 and to fix the Compact Disc 12 with the catch 15 of the lower case 14.

(10) After having fixedly stored the Compact Disc 12 in the lower case 14 in this way, the sliding table 73 which has been positioned at the loading section 31 is returned to the playback section 70 with the motor 77 and left in a stand-by state.

(11) In order to transport the Compact Disc 12 together with the disc case 11 out of the Compact Disc player 10, the motor 43 is reversely driven. Although the driving force is applied to rotate rollers 36 in the ejecting direction via the roller gears 37, the upper case 13 of the case 11 is locked and clamped with the lock levers 60 and the clamping members 51 so that the rollers 36 cannot rotate freely.

(12) When the motor 43 is further reversely rotated under this locked state, the lower case holder 34 is rotated upward together with the center gear 38, and the line connecting centers of the roller axes 35 becomes perpendicular to the direction of insertion and the lower case 14 is twisted by the upper and lower rollers and closed by the upper case 13. This time, the lock levers 60 are pushed by following the rotation of the lower case holder 34 to recede the lock members 61 behind the clamping members 51 to enable rotation of the clamping members 51.

(13) When the motor 43 is further rotated, the roller gears 37 are reversely rotated to slightly push back the disc case 11, and the levers 56 are rotated forward by force of the springs 57 to engage the members 58 with the stoppers 54. The horizontal posture of the lower case holder 34 is thus mechanically sustained.

(14) When the motor 43 is further rotated, the upper and lower rollers 36 are actuated to return the disc case 11 to the opening.

(15) When the disc case 11 has been returned, and the cams 52 of the clamping members 51 corresponding to the square holes 19 ride over the side walls 17, and the switch 63 is turned on, and then off when the cams slop off the side walls 17, the motor 43 is suspended, and at the same time the clutch gear 40 is released by the clutch plunger 41 to create a freely rotatable state for the upper and lower rollers 36.

(16) Then, the disc case 11 is manually taken out to complete the ejecting operation.

As described in the foregoing statement, according to the disc playback device of the invention, the Compact Disc 12 can easily and yet automatically be played back simply by inserting the Compact Disc 12 into the Compact Disc player 10 as it is housed in a commercially available disc case 11.

As it is not necessary to touch the Compact Disc 12 within the case 11 nor to open or close the case 11 with hands, the Compact Disc 12 is free from damages and stains, is fully protected, and is set for playback in a short time.

As the disc case 11 is adapted to be clamped at a position with its title sheet slightly projecting outward, the title of the disc can easily be recognized even during playback.

As the loading mechanism 30 is designed to function also as the opening/closing mechanism 32, the rollers 36 are adapted to conduct loading as well as ejecting, and the line connecting centers of the roller axes 35 of the rollers 36 is adapted to be inclined from the vertical direction to twist the disc case 14 for opening or closing, the structure of the mechanisms 30 and 32 can be reduced in size and in weight.

Therefore, the operations for insertion/releasing and opening/closing of the disc case 11 can be realized as a series of operation of a simple mechanism and driven by only one loading motor 43.

As the clutch gear 40 is interposed in the driven system, even if a large force is applied via the disc case 11, the mechanism would not be damaged whereby a higher reliability is achieved.

The clamping mechanism 50 of the disc playback device is advantageous in its structure wherein the cams 52 of the clamping members 51 can be engaged by the force of the springs 53 by utilizing the four square holes 19 and 20 on the upper case 13 of the case 11 to achieve clamping of the disc case 11. Displacement in horizontal as well as back and forth directions in this clamping operation is minimized as the cams 52 are engaged in the four square holes 19 and 20 to restrict movement in the four direction and displacement in right and left directions is restricted by the guide rollers 55 which abut on the side walls 17 of the case 11.

As there is provided the switch 63 behind the clamping members 51 corresponding to the square holes 19, it is possible to judge whether or not the disc case 11 is correctly clamped in the vertical as well as the horizontal direction by using the fact that the four square holes 19 and 20 are bored in an offset arrangement instead of a symmetrical arrangement.

As the lock levers 60 are provided behind the clamping members 51 corresponding to the square holes 20, when the cams 52 of the clamping members 51 are engaged with the square holes 19 and 20 to separate the lower case from the state where the disc case 11 is clamped, the lock levers 60 are lowered following the movement to lock the clamping members 51 to thereby secure the clamping state.

As the elevation of the press 89 by the mechanism 71 is synchronized with the mechanism 72 by the center knob 103 of the large spur gear 90 and the projection 102 of the cam arm 101 so as to be actuated only when necessary, timings of taking out or talking in of the Compact Disc 12 and of pressing the catch 15 of the case 11 will be synchronized to assure precise storage and takeout.

As the press 89 is attached on the member 87 via the limit springs 88, if an excessive force is applied on the catch 15, the force can be absorbed with the limit springs 88 to thereby avoid damages on the catch 15 and yet to apply sufficient and necessary force on the catch 15 for pressing.

Although this invention is applied to a Compact Disc player in the above described embodiment, the invention is not limited to the above but is applicable to a disc housed in a disc case which opens and closes by using one end as a fulcrum. If no square holes are bored in the disc case in advance, the holes can be opened easily.

Although the disc case 11 is described to be clamped in an open state at the loading section 31 during playback in the foregoing statement, it may be possible to construct the device so that after having taken out the Compact Disc 12 from the case 11, the case 11 is closed and is ejected outside the player 10. This modification can be realized by simply controlling the device electronically. Further, it may be constructed in such a way that the case is taken out only when the user wishes to read the liner note sheets.

According to the disc playback device comprising the loading mechanism (insertion/opening/closing mechanism) of this invention, since rollers for insertion whose axes are arranged in the direction perpendicular to the insertion direction of the disc case and which abut on both surfaces of the disc case opening and closing by pivoting about the base portion thereof and housing a disc and the mechanism which opens and closes the disc case by holding the disc case with the rollers at the base thereof and inclining the rotational axes of the rollers from the vertical direction are used for insertion as well as opening and closing of the disc case, the structure of the device can be made simple and can be driven by only one drive source.

As the insertion and opening and closing operations of the disc case can be conducted in a series of continuous operations, the loading can be completed within a short period of time.

As the insertion and opening and closing of the disc case are achieved via rollers, disc cases are free of damages.

In the case of Compact Discs, as they can be loaded in a state housed within a commercial disc case, discs are free of stains and damages and can be handled easily.

According to the disc playback device of the invention comprising the above described clamping mechanism, the clamping members used for clamping are formed inside the disc playback device corresponding to the square holes bored on both side surfaces of the disc case housing a disc and the disc case having a disc is clamped within the disc playback so that manual handling of the disc is obviated with resulting full protection and easy handling of the disc.

It is not necessary to store disc cases separately from title labels and linear not sheets nor transfer a disc from one disc case to another.

In the case of Compact Discs, as they are clamped by a clamping mechanism in a state housed within the disc case so that handling thereof becomes easier.

The clamping mechanism is constructed with a simple structure by simply providing the clamping members and yet can clamp the disc case securely.

According to the disc playback device of the invention comprising the mechanism to take out or in the disc, the device includes the press which presses or releases the circular catch for fixing the disc and the holding mechanism to hold the disc, so that the disc can be held with the catch pressed without manual handling to secure housing and takeout.

If this invention is applied to Compact Discs, standard disc cases available in the market can be used without any modification so that the handling of the device can be further simplified.

What is claimed is:

1. A disc playback device comprising:
    a loading mechanism which includes rollers which abut against both surfaces of a disc case and have rotational axes arranged perpendicular to the insertion direction of the disc case, the disc case containing a disc and being opened and closed by pivoting about the base portion thereof; and
    an opening/closing mechanism which opens and closes said disc case by holding said disc case on the base portion thereof with said rollers and inclining the rotational axes of said rollers in respect of a perpendicular direction to the insertion direction of said disc case.

2. A disc playback device as defined in claim 1 further comprising a clamping mechanism including clamping members provided within the disc playback device for being inserted in holes formed in both sides of said disc case housing and in corresponding arrangement to said clamping members on both sides of a disc case; and
    a posture detection switch actuated by the insertion of said clamping members in said holes for detecting whether or not the disc case has been loaded in a correct direction.

3. A disc playback device as defined in claim 2 wherein the disc case is of a type having a tip end portion and a rear end portion, the device further comprising a disc case tip end detection switch actuated by the tip end portion of said disc case when said disc case has been loaded in a predetermined position.

4. A disc playback device comprising:
    a disc housing and takeout mechanism including a pressing member which is reciprocally movable to press or release a circular catch formed at the center of a disc case to release a disc;
a holding mechanism for holding the disc which has been released from the catch and;
a moving member, supporting the holding mechanism and the housing and takeout mechanism, for removing the released and held disc from the case.

5. A disc playback device as defined in claim 4 further comprising an opening/closing detection switch for detecting opening or closing of said disc case.

6. A disk playback device comprising:
a loading mechanism including rollers which abut against both surfaces of a disc case and have rotational axes in the direction perpendicular to the direction of insertion of the disc case so as to take a disc housed in said disc case in or out of a loading section, the disc case being opened or closed by pivoting about the base portion thereof;
a clamping mechanism including clamping members for clamping the disc case by inserting the clamping members into holes or releasing the clamping members from holes formed in corresponding arrangement to the clamping members on both sides of a disc case housing a disc;
an opening/closing mechanism which opens and closes the disc case by holding the disc case on the base portion thereof with rollers of said loading mechanism and inclining the rotational axes of said rollers from a perpendicular direction to the insertion direction;
a pressing/releasing mechanism having a pressing member which can fix or release the disc by pressing a catch provided at the center of the disc case, the pressing member being provided in such a manner as to reciprocally move on a moving member movable between the loading section and a playback section;
a holding mechanism provided on said moving member which houses the disc in the disc case and takes out the disc from the disc case; and
a playback mechanism provided in said playback section which plays back the disc which has been transferred by said holding mechanism.

7. A disc playback device as defined in claim 6 further comprising lock lever means provided at the back of the clamping members for holding in a locked state said clamping members inserted into said holes formed on both sides of said disc case.

* * * * *